May 30, 1967 L. BALAMUTH ET AL 3,321,871
ULTRASONIC CLEANING METHODS AND APPARATUS
Filed March 5, 1964 9 Sheets-Sheet 2

INVENTORS
LEWIS BALAMUTH &
CLAUS KLEESATTEL
BY
Brumbaugh, Free, Graves & Donohue
their ATTORNEYS

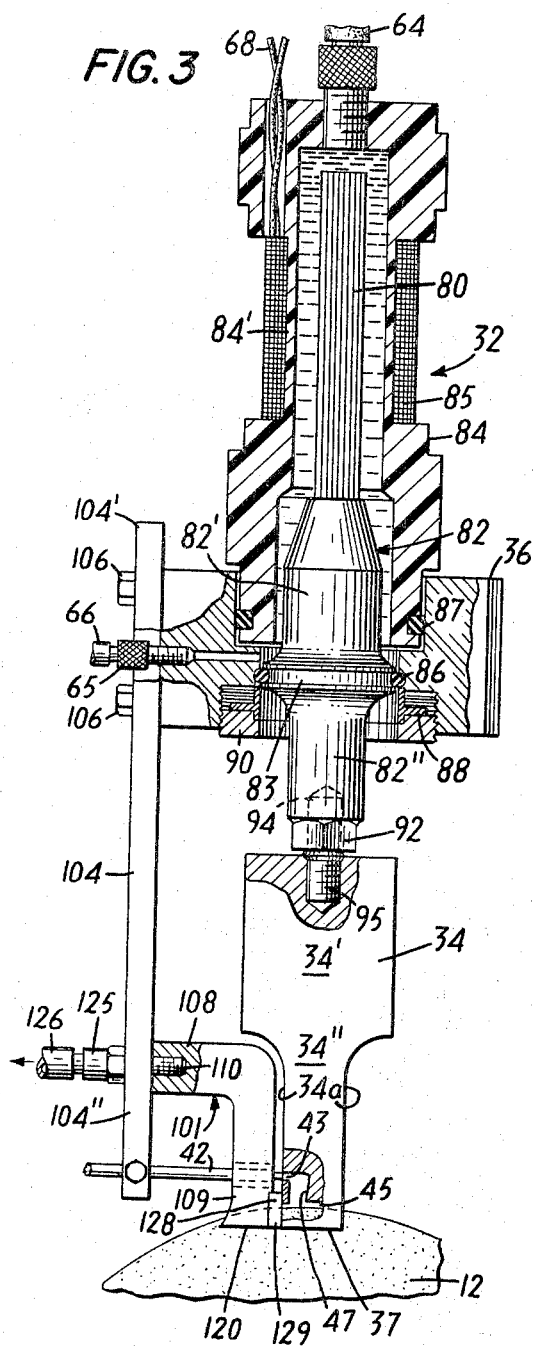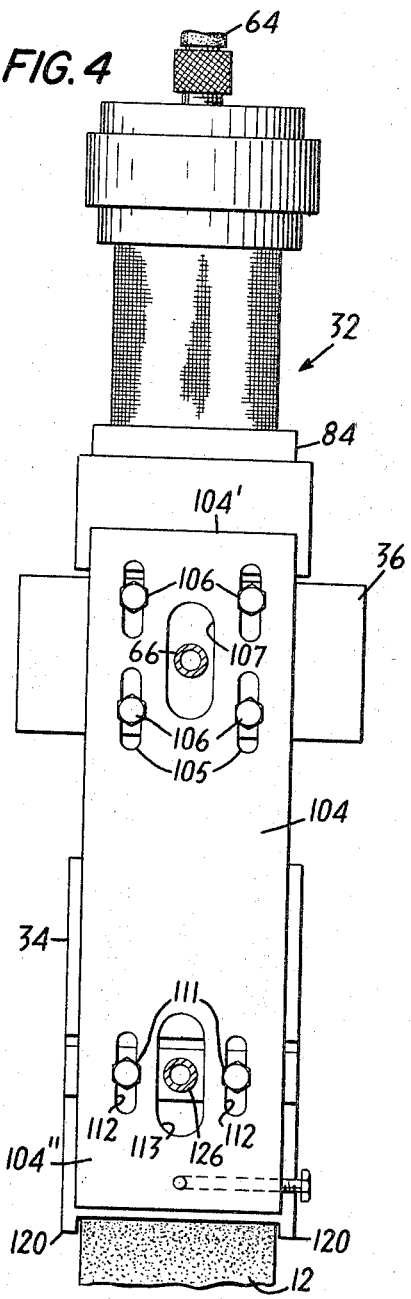

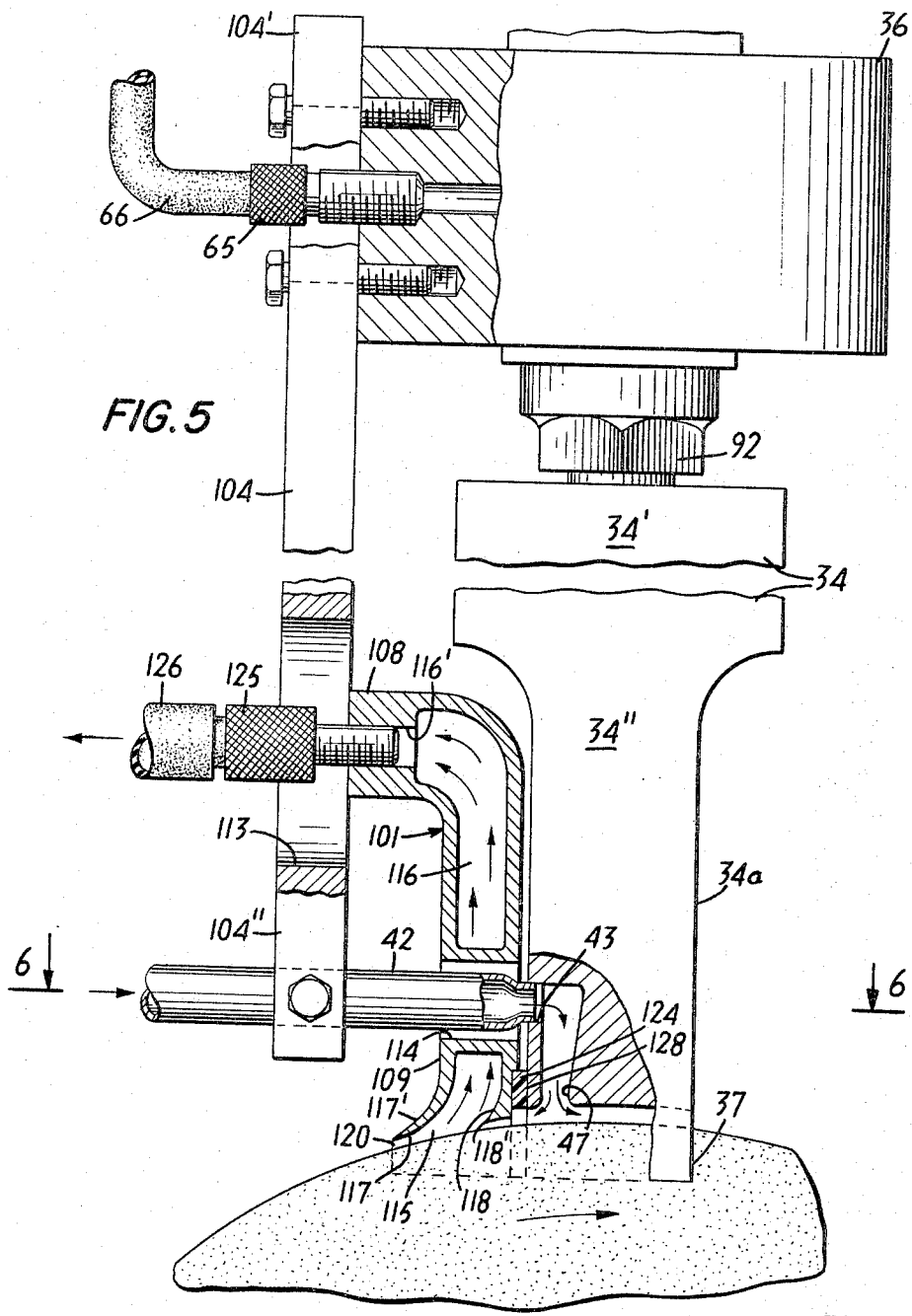

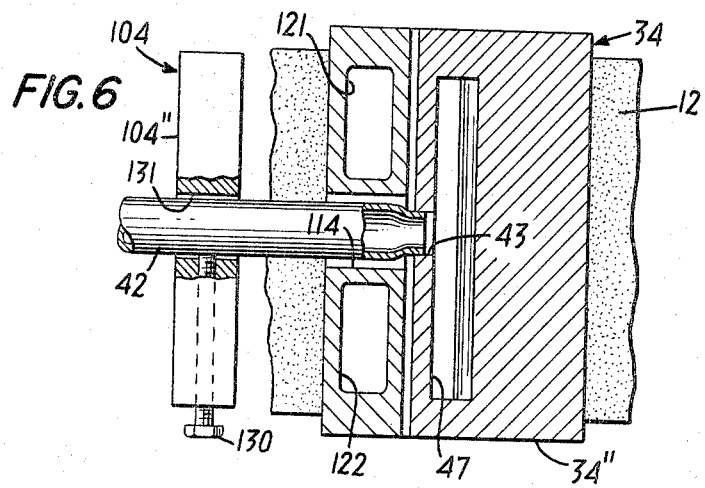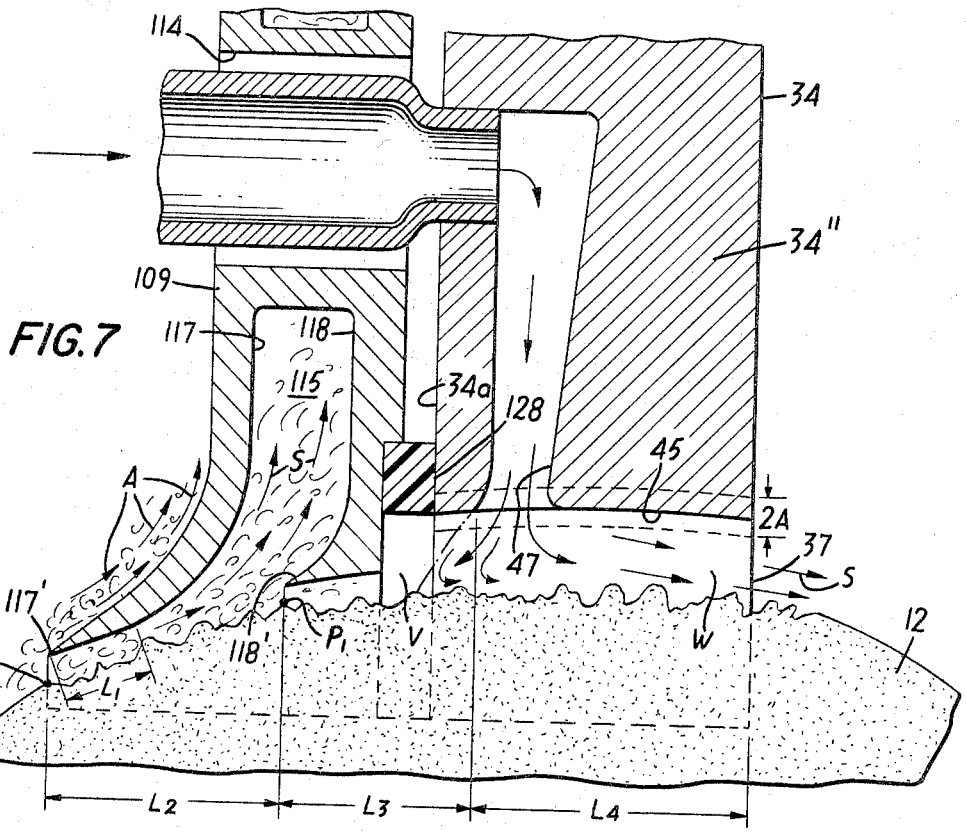

INVENTORS
LEWIS BALAMUTH &
CLAUS KLEESATTEL

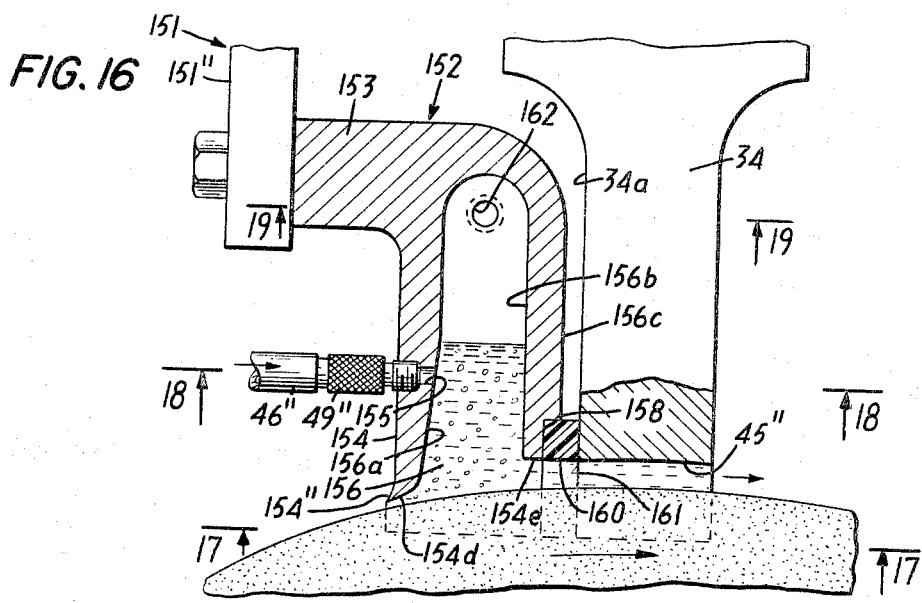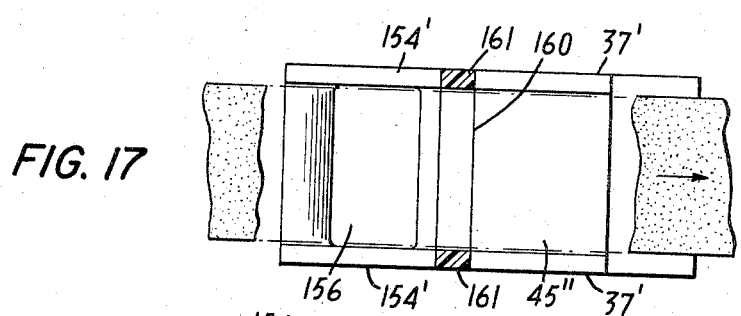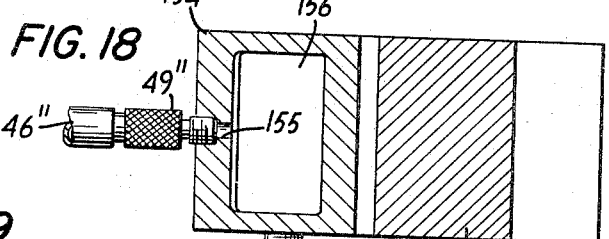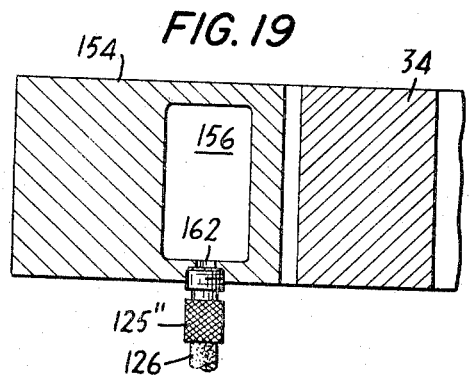

United States Patent Office 3,321,871
Patented May 30, 1967

3,321,871
ULTRASONIC CLEANING METHODS
AND APPARATUS
Lewis Balamuth, New York, and Claus Kleesattel, Forest Hills, N.Y., assignors to Cavitron Ultrasonics Inc., Long Island City, N.Y., a corporation of New York
Filed Mar. 5, 1964, Ser. No. 349,558
9 Claims. (Cl. 51—262)

This invention relates to methods and apparatus for cleaning grinding wheels utilizing ultrasonic energy, and more particularly to improved methods and means for removing the peripheral layer of air from the working surface of a rotating grinding wheel to increase the effectiveness of the cleaning operation.

In Patents Nos. 3,123,950, granted Mar. 10, 1964, and 3,123,951, granted Mar. 10, 1964, both assigned to the present assignee, there are disclosed methods and apparatus for removing metallic debris or other material impacted in the working surfaces of grinding wheels or the like. The techniques described therein utilize cavitational action induced by application of ultrasonic energy to a liquid layer maintained at a limited area of the surface to be cleaned. Cavitational action with its disruptive forces is produced at the working surface while it rotates or moves at normal operating speeds, thereby enabling the entire active surface to be cleaned without interfering with its productive activity.

By way of background, the ultrasonic cleaning unit described in the aforementioned patents is comprised generally of a transducer assembly actuated by a biased alternating current to provide a mechanical vibration at high frequency and of relatively small amplitude. The transducer is rigidly coupled to a cleaning tool having a head portion including a cleaning face closely conforming in shape to the grinding or working surface to be cleaned, and a pair of side flange portions overlapping the sides of the grinding wheel with minute clearance sufficient only to permit the grinding wheel to rotate therebetween. By virtue of the rigid coupling, vibratory energy is transmitted from the transducer to the cleaning tool, whose cleaning face thus vibrates relative to the surface to be cleaned and is separated therefrom by a gap of a few thousandths of an inch.

A quantity of cleaning fluid sufficient to maintain a cavitation supporting liquid layer between the cleaning face of the tool and the surface to be cleaned is supplied under pressure through suitable passages within the cleaning tool itself, or through nozzle means which drives the fluid with wedging force into the gap space in the direction of movement of the working surface. In the case of an abrasive wheel, the application of the liquid layer not only permits effective cleaning, but also results in cooler, and thus more effective, grinding.

Performance of the cleaning operation at optimum efficiency requires that a liquid layer be maintained at the cleaning site of the working surface for cavitational dislodgment and removal of particle debris. The less air entrapped by or combined with the liquid, the more intense and effective is the cavitational action that can be induced. The nature of the surfaces and dimensional tolerances involved in the above described cleaning technique sometime make it diffcult to obtain a solid liquid layer, especially when the speed of the working surface is high relative to the cleaning face, with a consequent degradation of cleaning efficiency. This is of particular concern in connection with grinding wheels.

It is known and discussed in the prior art that an air layer is formed on the outer surface of a rotating grinding wheel and rotates with it. The air film results both from effects at the rapidly moving peripheral surface of the wheel and from air pumped by centrifugal action from within the wheel through the interstitial spacing between the abrasive grains. When this air layer is present, it detracts from the ability of the apparatus above described to provide a solid liquid layer in the gap between the cleaning tool face and the surface to be cleaned, and thus detracts from its cleaning effectiveness.

It has heretofore been proposed to remove or "peel" the air layer from the surface of a grinding wheel by introducing an air barrier, such as a deflecting plate, in what is termed "kissing" contact with the wheel periphery. The plate, which is just barely in contact with the abrasive surface is intended to deflect the air film from the suface and allow coolant fluid, for example, to reach the wheel itself. However, this proposed solution presents several disadvantages which render it unfeasible as a practical matter. Firstly, it has been found virtually impossible to maintain for any appreciable time the condition of "kissing" contact between the deflector and the wheel. The abrasive action of the wheel, as well as the abrasive and debris particles which become separated from it during a grinding operation, rapidly wear away the contact edge of the plate to change the kissing contact to an appreciable gap in which the air film is produced.

Secondly, the rough surface of the grinding wheel transports in its asperities a substantial amount of air lying below the highest crests of the outer abrasive grains of the grinding wheel, which could not be eliminated even if it were possible to maintain the deflector in kissing contact. Both of these conditions are accentuated by the centrifugal pumping action of the rotating wheel which tends to continuously supply additional air to the wheel periphery, lessening the effectiveness of the deflector.

It is the primary object of the present invention to provide novel methods and apparatus for removing the layer of air from the peripheral surface of a rotating abrasive wheel, whereby a solid layer of liquid may be deposited in intimate contact with the abrasive surface.

Another object of the invention is to provide novel methods and apparatus usable in conjunction with the ultrasonic cleaning techniques and equipment disclosed in the aforementioned patents for enabling creation of a solid layer of fluid filling the cleaning gap, whereby cavitational action, and thus the cleaning effect, is enhanced.

A further object of the present invention is to provide improved methods and apparatus for eliminating the air layer from the peripheral surface of a rotating abrasive wheel which avoid deleterious abrasive effects associated with the wheel.

Yet another object of the present invention is to provide novel methods and apparatus of the character described utilizing a pressure differential created at the grinding wheel surface to remove the peripheral layer of air and facilitate the establishment of a solid liquid layer in intimate contact with the wheel surface.

Briefly, in accordance with the invention, a suction force is applied to the surface of the grinding wheel as it rotates by means of a hollow member shaped in the form of a hood or boot provided with side flanges that snugly overlap the sides of the wheel. For example, the pressure at the wheel surface may be reduced to between 5–10 p.s.i. absolute, although lower and higher pressures may be used depending upon specific operating conditions. Substantially all of the peripheral air on the wheel is thereby removed, creating a vacuum at the input edge of the cavitational gap between the cleaning tool and the wheel surface. This is followed immediately by application under pressure of the cavitational liquid into the gap, whereby a solid layer of liquid is established therein to enhance the cavitational action.

As an additional feature of the invention, the hollow member for applying the suction force and cavitational liquid also has a curved leading edge which acts as a deflector, and an underface positioned with minimal clearance with respect to the peripheral wheel surface. This configuration combines the limited effectiveness of the simple deflector with the ability of the suction system to remove air, thereby increasing its effectiveness and capacity, and/or reducing the suction force required for satisfactory results. Since both air removal techniques are employed, the deflector need not be placed in kissing contact with the wheel and the aforementioned wear problems are avoided.

In one specific embodiment of the invention, the hollow member or hood is utilized merely for removing the air layer from the wheel surface and the cavitational liquid is supplied through ports in the cleaning tool itself. In a second embodiment, the hollow member also serves as a liquid source. As in the other embodiment, the hollow member is placed immediately in front of the cleaning gap but includes a separate interior channel for supplying the liquid to the cleaning gap.

According to yet another embodiment of the invention, the liquid is applied to the surface of the grinding wheel through a hollow member having a chamber which acts as a reservoir retaining a supply of liquid. The chamber is also connected to a source of suction force or vacuum to promote the removal of air from the periphery of the grinding wheel. The lower end of the chamber is provided with a leading edge placed in close proximity to the peripheral wheel surface to act as a deflector, and a rear edge spaced somewhat from the wheel surface to permit the flow from within said chamber of a solid layer of liquid substantially free of all entrapped air between the vibrating cleaning face and the rotating wheel periphery.

The foregoing and other objects, features and advantages of the present invention will become more apparent from the following detailed description thereof, when taken in conjunction with the accompanying drawings, in which:

FIG. 3 is an enlarged longitudinal sectional view of the transducer assembly of the cleaning attachment and the hood assembly of the peripheral air removal device of FIG. 2, mounted in operative relation to a grinding wheel, certain parts of the transducer and hood assemblies being shown in section to illustrate structural detals, and as the same would appear when viewed along line 3—3 of FIG. 2;

FIG. 4 is a side view of the apparatus of FIG. 3;

FIG. 5 is an enlarged view of the lower portion of the apparatus shown in FIG. 3 illustrating partly in section some of the structural details thereof;

FIG. 6 is a further enlarged fragmentary section of the suction hood, suction hood support bracket and cleaning tool viewed along line 6—6 of FIG. 5, this view showing further details of the passages in the suction hood;

FIG. 7 is a greatly magnified side view, in section, of the lower portion of the suction hood and vibratory cleaning tool of FIG. 4, showing the irregular surface of the grinding wheel periphery to aid in explaining the principles of the present invention;

FIG. 16 is an enlarged side view, partly in section, of the lower portion of FIG. 15, showing the cleaning tool of the transducer assembly and the suction and liquid supply block in operative relation to a grinding wheel;

FIG. 17 is an underface view of the working faces of the suction and fluid supply block and cleaning tool shown in FIGS. 14 and 16, taken along the line 17—17 of FIG. 16;

Figure 14:
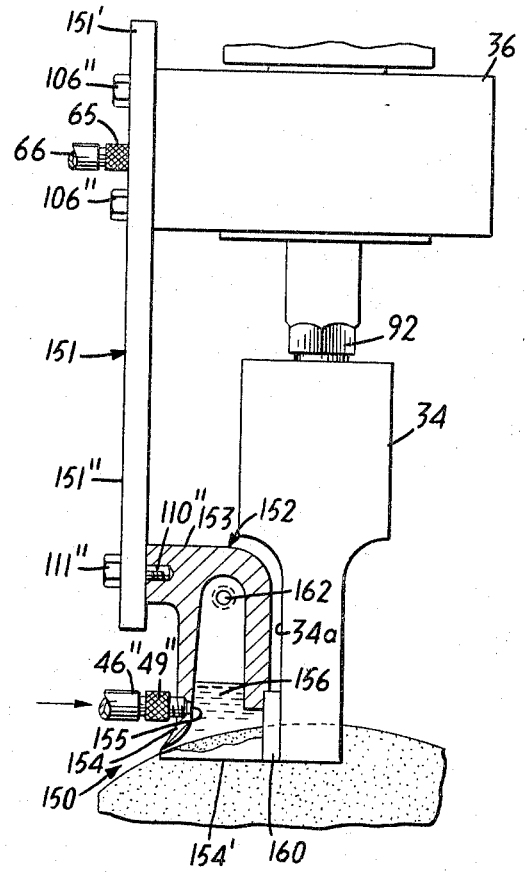
FIG. 14 is a view similar to that of FIG. 3 illustrating a further embodiment of the invention.

FIG. 18 is a fragmentary transverse section of the suction and fluid supply block and the cleaning tool shown in FIGS. 14 and 16 taken along the line 18—18 of FIG. 16; and FIG. 19 is a fragmentary transverse section of the suction and fluid supply block and cleaning tool shown in FIGS. 14 and 16 taken along the line 19—19 of FIG. 16.

Similar reference characters refer to similar parts throughout the several views of the drawings and the specification.

Figure 1:
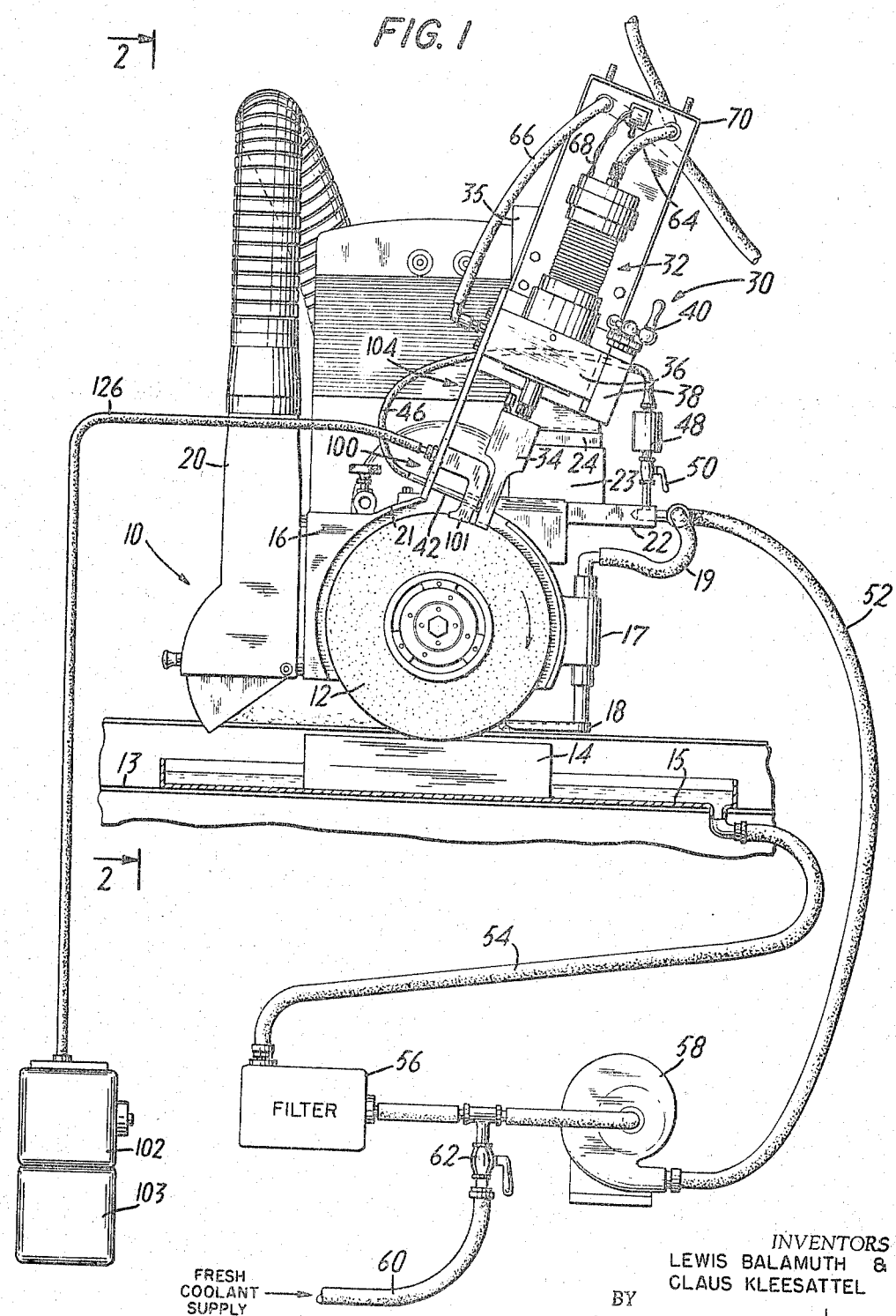
FIG. 1 is an elevation view of a conventional grinding machine with a cleaning attachment and an air removal device of the present invention in place thereon.
Figure 2:
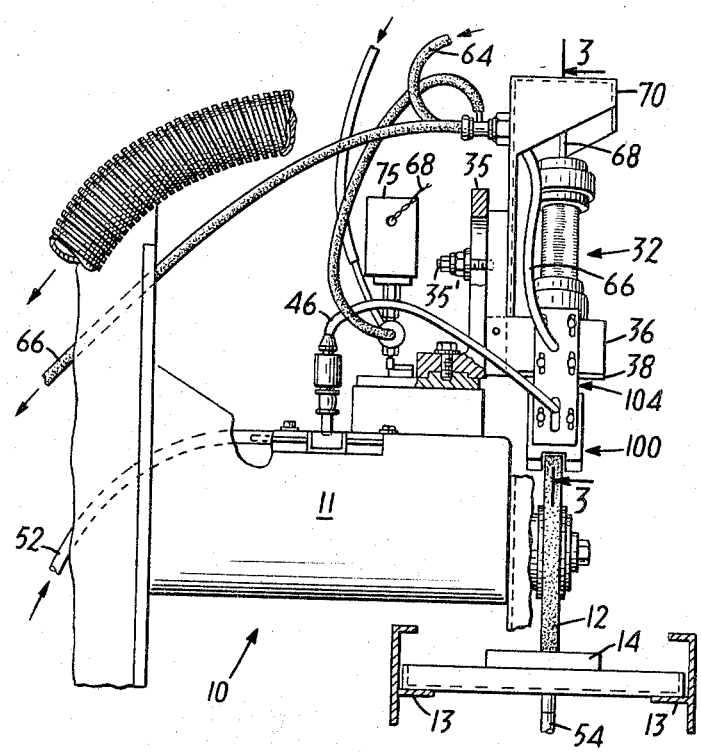
FIG. 2 is a fragmentary side elevation of the grinding machine, cleaning attachment and air removal device with certain parts shown in section, and as the same would appear when viewed along line 2—2 of FIG. 1.
Figure 13:
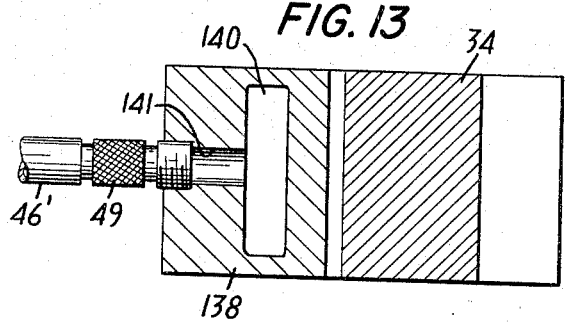
FIG. 13 is a fragmentary transverse section of the suction and fluid supply block and cleaning tool shown in FIGS. 8 and 10 as the same would appear when viewed along line 13—13 of FIG. 10.

FIGS. 1 and 2 illustrate a typical grinding machine 10 of conventional type, having a grinding wheel 12 mounted on a shaft journaled within a shaft housing 11. The grinder includes a work supporting table 13 having a workpiece holding surface 15 of any suitable type known in the art, and the grinding wheel 12 is vertically adjustable to control the depth of cut. The table 13 generally is arranged to horizontally reciprocate in both directions to thereby pass the workpiece 14 back and forth under the wheel 12. Means are also provided to adjust the workpiece supporting table 13 perpendicularly with respect to the wheel 12.

The grinding wheel 12 is provided with a conventional wheel guard 16, parts of which have been removed in FIGS. 1 and 2 for purposes of the illustration. A bracket 17 mounted on the wheel guard 16 supports a nozzle arrangement 18 through which cooling fluid is supplied to the grinding area between the wheel and the workpiece. A suction device 20 is also provided to withdraw particles of debris material removed from the workpiece 14. Cooling fluid is supplied to the nozzle 18 by means of a pump 58 which forces the fluid through conduit 52 and thence into conduit 19 to the nozzle. The workpiece supporting table 13 is provided with a rim and thus forms a catching tray for the coolant, which is returned via conduit 54 and filters 56 back to the pump 58. A fresh coolant supply is coupled through the tube 60 and valve 62 to the pump so that fluid that has been lost during the normal grinding process may be replaced as needed. All of the above described grinding machine structure is conventional and has been included merely to provide a background for explaining the construction and operation of the subject of this invention.

A grinding wheel cleaning attachment 30, of the type described and claimed in a aforementioned Patent No. 3,123,951, is shown supported by a support plate 22 which is fixed to the shaft housing 11 and mounted on positioning blocks 23 and 24 adjustably secured to plate 22. An angle bracket member 35 has a horizontal leg dovetailed with block 24 for slidable movement in relation thereto, and a vertical leg having a longitudinal slot for adjustably receiving a mounting bolt 35' projecting from the wheel cleaning apparatus 30.

The wheel cleaning apparatus 30 embraces a vibrator assembly 32 which includes a vibrator unit presenting a transducer section 80 having one end thereof rigidly fixed to one end of an amplitude increasing connecting body 82 and whose other end is rigidly secured to the vibration input end of a cleaning tool or shoe 34, as shown in FIG. 3. The transducer section 80 and a part of the connecting body 82 are contained within a generally cup-shaped housing 84 whose open end is mounted on a support block 36 which is slidably connected by a dovetail connection to a mounting member 38, and which is in turn fixed to the vertical leg of angle bracket 35. Support block 36 is slidably adjusted with respect to support member 38 by means of a micrometer hand wheel 40, whereby precise positioning of the working end of the cleaning tool with respect to the grinding wheel may be effected.

As shown in FIG. 3, the open end of the vibrator housing 84 is fitted within a pocket formed in the mounted block 36, with a resilient sealing ring 87 positioned therebetween. A gas or liquid coolant is introduced into the vibrator housing 84 by inlet tube 64 coupled to the closed end of the housing to cool the transducer section 80 and that part of the connecting body 82 contained in the housing 84. The warmed coolant is withdrawn through a bore formed in the mounting block 36 which is connected to outlet tube 66.

The transducer section 80 of the vibrator unit, which is composed preferably of a stack of magnetostrictive plates, is energized and set into longitudinal virbration by a high frequency alternating magnetic field established by a coil 85 wound on a relatively thin intermediate tubular wall section 84' of the housing. The housing 84 is composed, for example, of a nonconductive material such as nylon, as indicated in FIG. 3, which does not interfere with the high frequency magnetic field produced by the transducer coil, although other materials may be used.

The coil winding 85 is supplied with biased alternating current of selected high frequency in the ultrasonic range by a pair of current conductors 68 extending through a longitudinal bore formed in the upper portion of the housing 84. A junction box 72, as shown in FIG. 2, couples the conductors 68 to receive the output of a suitable oscillation generator (not shown). The vibrator assembly 32, as shown in FIGS. 1 and 2, may be housed in any convenient case 70 having an access cover (not shown) to effectively seal the vibrator assembly 32 against dirt and damage.

Although a magnetostrictive type operating in the ultrasonic range is indicated as preferable, the transducer section 80 may take one of a number of other electromechanical forms, such as electrodynamic or piezoelectric. The operating frequency may be in the high sonic or ultrasonic ranges, but preferably is in the order of 20,000 to 40,000 cycles per second. At these frequencies, a transducer section 80 of the magnetostrictive type is most desirable. The plates of which the transducer section 80 is formed are fabricated of a metal such as Permanickel, Permendur, or other metals which have high tensile strength and are highly magnetostrictive to provide maximum longitudinal vibration when subjected to the influence of an alternating magnetic field, such as is established by the biased alternating current supplied to the winding 85.

The connecting body 82 is rigidly secured at its upper end to the transducer section 80 by silver solder or other permanent fastening and is formed of a material, preferably metal, of high tensile strength and vibration transmitting capability. The configuration of the element 82 is chosen so that it functions as an acoustic impedance transformer, to increase the amplitude of longitudinal vibrations transmitted therethrough. The cleaning shoe or tool 34, as shown in FIG. 3, may be permanently or detachably but rigidly, connected to the vibration output end of the connecting body 82 by means of a stud having an enlarged intermediate body section 92 of polygonal form to which a wrench may be applied, and from which opposite stud sections 94-95 extend into threaded engagement with connecting body 82 and the tool 34. The cleaning tool 34 may be formed of the same metal as the body 82, or of a different metal of high tensile strength and capable of transmitting longitudinal vibrations therethrough. The use of a detachable connection as shown permits the cleaning tool 34 to be of a different metal, such as an aluminum alloy, than the connecting body 82, and also to be readily removed and replaced with another cleaning tool having a working face 45 of different area and width.

The transducer section 80, connecting body 82 and cleaning shoe 34 may be unitarily assembled to provide the vibrator unit, and the vibrator unit is mounted or suspended in the mounting block 36 by providing the connecting body 82 with a nodal flange 83 located at the approximate nodal area of longitudinal vibration thereof. It will be understood of course, that for optimum efficiency, the transducer section 80, the connecting body 82, and the tool 34 will each be equal in length to an integral number (preferably one) of half-wave lengths in the material of which it is formed at the operating frequency. The nodal flange 83 is provided with a peripheral groove which receives a resilient mounting and sealing ring 86 positioned to abut against a longitudinal shoulder formed in the bore of the mounting block 36, and held in sealing position by means of a retainer ring 88 and a threaded plug ring 90 which is threaded into the bore of the mounting block 36 as shown in FIG. 3. Thus, the entire vibrator unit comprising the transducer stack 80, connecting body 82 and cleaning tool 34 may be withdrawn from the mounting block 36 and housing 84, and replaced with another vibrator unit as desired. When the vibrator unit is in mounted position, with the sealing ring 86 locked in mounted position by the retainer and plug rings 88 and 90, leakage of the transducer coolant from the coolant chamber defined within the housing 84 and mounting block 36 is prevented.

Primary amplification of the longitudinal vibrations injected by the energized transducer stack 80 into the input end of the connecting body 82 is effected by making the vibration input section 82' on one side of its nodal flange 83 of substantially greater mass than its output section 82" on the opposite side of its nodal flange 83. Secondary amplification of the longitudinal vibrations injected into the input section 34' of the cleaning tool 34 by the primary amplitude increasing connecting body 82, is effected by making the mass and average cross-sectional area of the input section 34' of the tool 34 greater than the corresponding dimensions of its output section 34", as is evident by referring to FIGS. 1, 2 and 3. The principles of amplitude magnification of vibrating bodies is explained in greater detail in Reissue patent Re. 25,033, assigned to the present assignee.

The cleaning tool or shoe 34 may be composed of a substantially solid block of metal, such as an aluminum alloy, having good vibration transmission capabilities and high fatigue stress level. As seen best in FIG. 5, the cavitational liquid supplied via conduit 46 flows through tube 42 into an internal passage 43 formed within the lower end of tool 34. A transverse outlet slot 47 is provided extending across the width of the cleaning face 45 to supply a copious flow of liquid into the cleaning gap over the entire width of the shoe face at one time. The tool 34 includes at its lower end a pair of side flanges 37 overlapping the respective sides of the wheel with minimum clearance, to aid in confining the liquid to the cavitational gap of the clearing site.

Fluid for the cavitational cleaning layer is introduced under pressure to the cleaning face 45 of the tool 34 by means of a tube 42, fixedly supported from the block 36 by support plate 104. It has been found that several commercial fluids, commonly used to cool and lubricate the grinding wheel and workpiece area being ground or polished, possess properties necessary to permit cavitation, and the same fluid supplied by fluid line 52 may be used for both purposes. Accordingly, the tube 42 which supplies fluid for cavitational purpose to the cleaning tool or shoe 34, may be connected by a flexible tube 46, a secondary fluid filter 48, a flow control valve 50, and a fluid receiving bore in support plate 22, and which bore is directly connected to the main fluid supply line 52, as shown in FIGS. 1 and 2. The fluid ejection nozzle 18, positioned adjacent the work area being ground or polished, may be connected by branch tubing 19 to the main fluid supply line 52, so that the same fluid also serves as the grinding wheel and workpiece lubricant and coolant. It will be appreciated that the pump 58 drives the fluid through supply tube 52 in sufficient volume and under sufficient pressure to provide an adequate cleaning fluid supply for both the ejection nozzle 18 and tube 42, and that the volume and pressure of cleaning fluid supplied by tube 42 to the cleaning tool or shoe may be further adjustably controlled by the valve 50.

From the above, it is apparent that the vibratory mechanism 30 is operative to effect vibration of member 34, and that pump 58 supplies a sufficient quantity of cavitational liquid to the discharge port 47 in the cleaning face of the tool 34 to maintain a cavitational layer in the cleaning gap. The cleaning effect is attained by virtue of the disrupting action of the cavitational forces engendered in the liquid layer by the high frequency, low amplitude vibration of the cleaning tool.

Although the foregoing arrangement operates to a high degree of satisfaction under many conditions of use, the present inventors have found that in certain grinding applications, the establishment of a sufficiently solid liquid layer in the cleaning gap is sometimes difficult to achieve. During working rotation of the grinding wheel, the sharp abrasive grains on the wheel periphery which perform the cutting, also operate as minute fan blades which direct a substantial amount of air into the cleaning gap. The air pockets thus produced in the cavitational layer reduce the cavitational action and diminish the cleaning ability of the system.

The amount of air pocketed at the grinding wheel surface is dependent upon the surface condition of the grinding wheel used. Thus if a wheel has a coarser granular structure, there is a tendency for a greater amount of air to be retained on its periphery. Therefore, the injected cleaning liquid remains adjacent to the shoe working face and is "cushioned" by a layer of air pockets hugging the grinding wheel surface when the wheel is rotated at grinding speeds. Where the grinding wheel is of a porous or "open cell" structure, additional air is centrifugally driven or pumped through the wheel structure itself to objectionably augment the peripherally introduced air. This serves to further enlarge the air pockets or air layer hugging the peripheral surface of the grinding wheel.

When the grinding wheel is stationary or rotated at speeds much below those necessary to perform any grinding work, the objectionable peripheral air may be forced out of the cleaning gap simply by driving a sufficient supply of pressurized cleaning fluid into the gap. However, this is not possible with the wheel rotating at working speeds. Accordingly, other means for accomplishing this must be provided.

One such apparatus made in accordance with the present invention is illustrated in FIGS. 3 through 6, and is seen to be attached to the mounting block 36 of the ultrasonic vibratory unit 30. A support plate 104 having an upper portion 104' contains longitudinal slots 105 to permit slidable movement of the support plate 104 in relation to block 36. Bolts 106 extending through the longitudinal slots 105 and threadedly received in tapped holes formed in support block 36 secure the support plate 104 to the block 36 after the air eliminator unit 100 is properly manually adjusted in relation to the periphery of the grinding wheel 12. Longitudinal slot 107 permits the pipe fitting 65 to couple the conduit 66 to the block 36.

Referring more particularly to FIGS. 3 and 5, a suction hood 101 may be detachably connected to the lower portion of the support plate 104" by means of bolts 111 extending through longitudinal slots 112 in the lower portion of the support plate 104" and into threaded engagement with threaded bores 110 in the hood. By removing the bolts 111 the suction hood 101 can easily be removed for replacement or be realigned whenever necessary in proper position in relation to the grinding wheel 12. Longitudinal slot 113 in the plate 104 permits coupling of suction hose fitting 125 to the hood.

The suction hood 101 preferably comprises an inverted L-shaped member having a head portion 109 and a neck portion or extension 108. The head portion 109 is provided with an opening 114 (FIGS. 5 and 6) permitting tube 42 to pass therethrough to the cleaning tool 34. The hood is generally hollow having an upper chamber 116 and a lower chamber 115 connected therewith by channels 121 and 122 straddling the opening 114 (see FIG. 6). Each portion of the tool 101 may be made substantially rectangular in cross-section, and with substantially uniform transverse thickness to provide substantially parallel side faces throughout its length. The lowermost portions 117 and 118 of the head portion 109 are shaped in substantial conformity with the periphery of the grinding wheel and each contains a curved leading edge 117' and 118' respectively to act as an air deflector. The head section 109 also includes a pair of side flanges 120 shaped and designed to neatly overlap the sides of the grinding wheel to which it is applied.

Referring to FIGS. 3 and 5, the suction boot 101 is positioned directly forward of the leading edge of the cleaning shoe 34. A U-shaped sealing gasket 128 formed of a resilient but wear-resistant material is positioned between a recess 124 in the rear wall 118 of the boot 101 and the leading face of the cleaning shoe 34, extending downwardly to fill the spaces between the respective boot flanges 120 and the adjacent end of the cleaning shoe flanges 37, to prevent the entry of air therebetween. The gasket 128 may be secured to the boot 101 by means of an adhesive or any other suitable means.

As shown in FIG. 5, a bore 116' is drilled into the neck portion 108 of the boot 101 in the direction of the wheel rotation to communicate with the upper chamber 116. The suction force is introduced into the open end of the bore via flexible tubing 126 which is threadedly connected by means of hose fitting 125 to the bore and thus to the interior chambers of the hood 101. The other end of the tubing 126 is secured to a driven pump motor unit 102 (FIG. 1) so that, when the latter is operated, suction is created within the hood 101. A tank or receptacle 103 is provided on the pump 102 to receive debris that is drawn off during operation.

The edge surfaces 117, 118 of hood 101 may be made with replaceable edges such as of nylon or other plastic material to permit the replacement when the edges of said surfaces have become pitted from the debris being removed from the periphery of the grinding wheel.

With the suction hood 101 mounted on the support block 36 as shown, it is possible to precisely maintain minimal clearance between the lower section of the suction boot 101 and the grinding wheel periphery by means of micrometer hand wheel 40. Accordingly, precise positioning of the working end of the cleaning tool and the suction boot with respect to the grinding wheel may be simultaneously effected. It will be realized, of course, that this mounting structure may be varied as desired to accommodate the precise design of the grinding machine and cleaning attachment used. For example, the suction hood 101 may be independently mounted by means of support plate 104 to the peripheral wall 21 of the wheel guard housing 16.

As described in connection with the cleaning tool 34 in the aforementioned patents the suction hood 101 may be formed or fitted to the wheel by pushing the lower end of the hood into grinding contact with the peripheral surface of the grinding wheel with which the hood is to be used, until the side flanges 120 have been formed which snugly overlap the sides of the grinding wheel for approximately ⅛ of an inch. This procedure provides the desired minimal clearance between the side flanges 120 of the hood and the sides of the grinding wheel and also provides the lower edges of the hood 101 with contoured surfaces which are in substantial arcuate conformity to the outer peripheral surface of the grinding wheel. The hood 101 is then backed off from the peipheral surface of the grinding wheel by an amount sufficient so that the instep portion 117' serves as a baffle for initially deflecting peripheral air.

As shown in FIGS. 5 and 6, the fluid to be cavitated is introduced into the internal passage 47 of cleaning tool 34 by means of tube 42. A bore 131 is provided in the lower portion 104" of the support plate 104 having the same diameter as the tube 42 to support said tube therein. A lock screw 130 threaded into the lower portion 104" and against the tube 42 secures the latter in adjusted position. The hood 101 is provided with a central circular bore 114 to provide a clearance between said bore and the outside diameter of tube 42.

Operation of the air elimination apparatus can best be explained by reference to FIG. 7 which is a greatly magnified fragmentary section showing the lower portion 109 of the hood 101 and the lower section 34" of the cleaning tool 34 in spaced relation to the periphery of the grinding wheel 12. As previously explained, one object of the present invention is to eliminate the air that acts as a cushion and prevents the generation of cavitation by the vibrating tool at the peripheral surface of the grinding wheel. The grinding wheel surface is illustrated as it might appear under a microscope, or to the naked eye if a particularly coarse grained wheel is being used.

The solid arc designated by the reference numeral 25 represents the highest of all the grains on the peripheral surface of the grinding wheel. The leading edge 117 of the boot 101 serves to act as a baffle for initially deflecting the peripheral layer of air that is rotating with the grinding wheel in the direction indicated by the arrow. At point P on the wheel periphery, the deflector lip 117' causes a part of the air A to be deflected. The remaining peripheral air passing under the hood 101 is subjected to the suction force S generated by the pump 102, and is drawn upwardly away from the wheel surface in the chamber 115. The air thus removed is exhausted through the pump 102 and the debris collected in receptacle 103. Accordingly, by the time the point P on the wheel has moved an arcuate distance L2 to point P1, a substantial portion of the air hugging the wheel periphery has been removed. Additional air deflection into the chamber 115 is provided by the leading edge 118' of the rear wall 118 of the suction shoe.

The combined effect of the deflecting surfaces 117' and 118' and the suction chamber produces at the surface of the wheel a low pressure condition, or rarefaction, in which the number of remaining air molecules is insufficient to interfere with cavitation at the wheel surface. Stated another way, the foregoing arrangement removes a sufficient quantity of the peripheral air from the wheel surface to enable the creation of a substantially solid cavitational liquid layer in the cleaning gap immediately following it.

The gasket 128 prevents the entry of any appreciable quantity of air behind the hood 101 and maintains the rarefaction over the arcuate length L3 and into the cleaning area.

The cavitational liquid W is supplied through the channel 47 in the end face of the vibrating cleaning tool 34 to form a solid layer of cavitational liquid between the smooth cleaning face 45 of the tool and the rotating wheel periphery. If the cavitational liquid is introduced under sufficient pressure, it will displace the small amount of air remaining at the wheel surface or which may be introduced by centrifugal pumping action.

With a solid liquid layer maintained in the cleaning gap, vibration of the cleaning tool 34 establishes intense cavitation in the liquid at the wheel surface over the arcuate length L4. The powerful disruptive forces thus created are effective to dislodge particles removed from the workpiece and other debris that become firmly impacted between the abrasive grains of the wheel during the grinding operation.

In addition to facilitating the removal of impacted debris from the wheel surface, the inventors have found that elimination of the air layer enables deeper penetration of the liquid coolant into the wheel structure. Every grinding wheel is made up of abrasive grains plus a bond that supports them and holds them together. The structure is determined by the relative percentages of abrasive and bond and their spacing within the wheel. These air spaces provide clearance for the chips produced in the grinding process. The inventors have found that the intense ultrasonic cavitation resulting from elimination of peripheral air enables the coolant under pressure to work its way into these air spaces to a greater depth in the grinding wheel than heretofore has been possible. The wheel itself thus acts as a good heat sink, allowing cooler, and consequently better, grinding.

The foregoing effect will be more readily appreciated from consideration of the pumping action of the vibrating tool on the cavitational liquid, as shown in FIG. 7. During the upward stroke of the tool 34, i.e., while the tool surface 45 is moving away from the wheel surface 25, new liquid rushes into the void. This refilling action results firstly, from the liquid fed through the internal passage 47 of tool 34 and secondly, from the shifting of the liquid layer in the gap due to the wheel motion. During the down stroke of the tool, the liquid strongly resists sideward displacement because of the great accelerations involved and the retaining flanges 37. The extent of the downward motion depends upon the amplitude of vibration A of the tool, and therefore, the pumping effect will increase with amplitude A or stroke 2A (see FIG. 7). Consequently, once the peripheral layer of air is almost entirely removed from the surface of the grinding wheel, the vibratory energy of the cleaning tool is able to force the coolant deeper into the wheel against the back pressure created by the centrifugal forces of the rotating wheel.

Thus, the elimination of the air boundary layer has two beneficial effects. It permits the liquid coolant to be properly cavitated at the surface of the grinding wheel beneath the face or cleaning shoe 34, thereby cleansing the wheel of accumulating debris, and also pumps the coolant into the grinding wheel to a greater depth than heretofore possible to enable operation at lower temperatures. The present teaching accordingly makes it possible to maintain a grinding wheel, operating at working speeds, clean and cool at the same time.

FIGS. 1 through 7 illustrate one embodiment of the invention for use in conjunction with an ultrasonic cleaning device in which the cavitational fluid is supplied to the surface of the wheel through internal passages provided in the tool itself. The applicants have found it also desirable, under certain conditions, to simultaneously remove the peripheral air and supply the fluid to be cavitated through a member or members positioned in abutting relation to the tool to be vibrated rather than through the tool itself. In this manner the expense of machining the internal ports within the tool is thereby avoided.

An alternate form of the invention operating in this manner is illustrated in FIGS. 8 through 13. As seen best in FIGS. 10 and 11, the cleaning shoe 34 used in this embodiment has no internal liquid passages and its cleaning face 45' is smooth and unbroken. The usual side flanges 37 are provided and the entire tool lends itself to inexpensive manufacture and maintenance.

Figure 9:
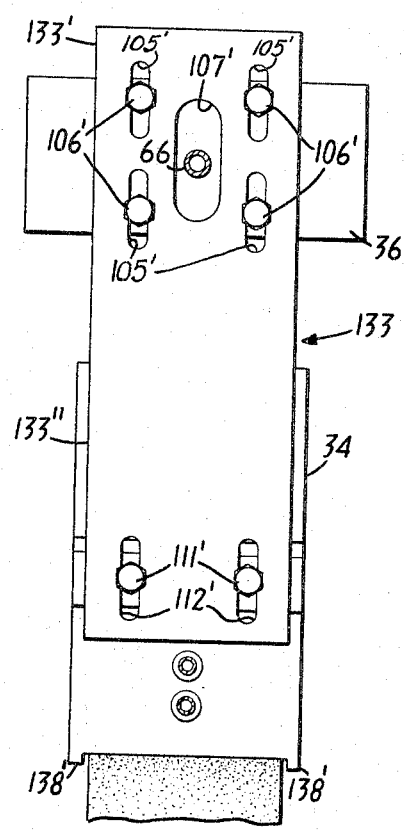
FIG. 9 is a side view of the cleaning attachment and suction and fluid supply block of FIG. 8, mounted in operative relation to each other and to a grinding wheel.
Figure 8:
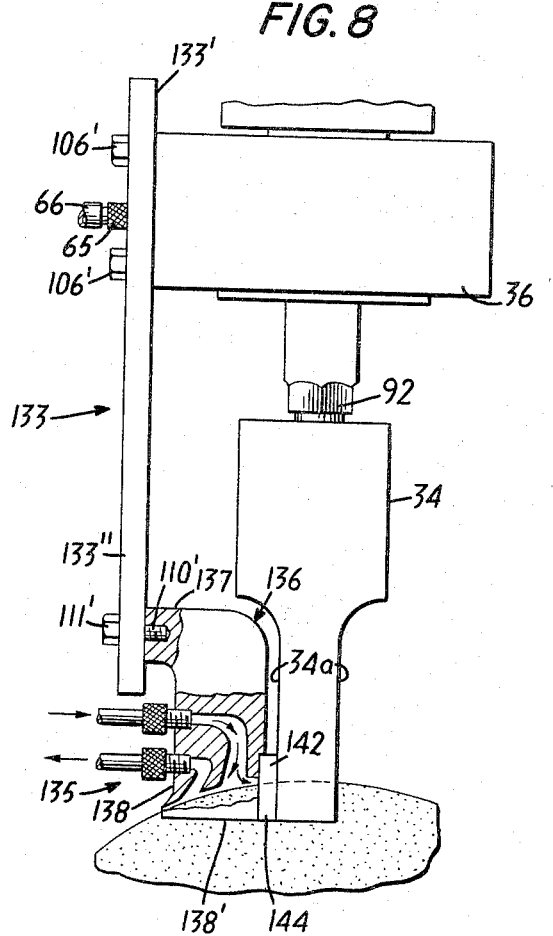
FIG. 8 is a view similar to that of FIG. 3, illustrating another embodiment of the invention wherein the cavitational fluid and the suction force are supplied through one member.

Turning now to FIGS. 8 and 9, support plate 133 has an upper end 133' fixed to a suitable stationary support on the grinder, or as illustrated, to the support block 36 of the vibratory unit 30, and a lower section 133" of the support 133 which carries the air eliminating assembly 135. Longitudinal slots 105' are provided in the upper plate support 133' to permit slidable movement for the support plate 133 in relation to the block 36. Bolts 106' extending through the longitudinal slots 105' and threadedly received in tapped holes formed in support block 36 are used to secure the support plate 133 to the block 36. Longitudinal slot 107' provides clearance between said slot and the pipe fitting 65.

The hood 136 is generally similar in external configuration to the hood 101 of the previously described embodiment and is in the form generally of an inverted L. The neck portion 137 is provided with a pair of tapped holes for receiving bolts 111' to secure it to the lower portion of plate 133. The slots 112' in the latter provide a degree of adjustability. Alternatively, the hood may be soldered or welded to the plate 133. As in the case of the embodiment of FIGS. 1 to 7, mounting of the support plate 133 on the block 36 enables simultaneous positioning of the hood and cleaning tool by means of micrometer adjustment 40. Of course, if desired the plate 133 may be fixed for example to the wheel guard housing or other part of the grinding machine.

Figure 10:
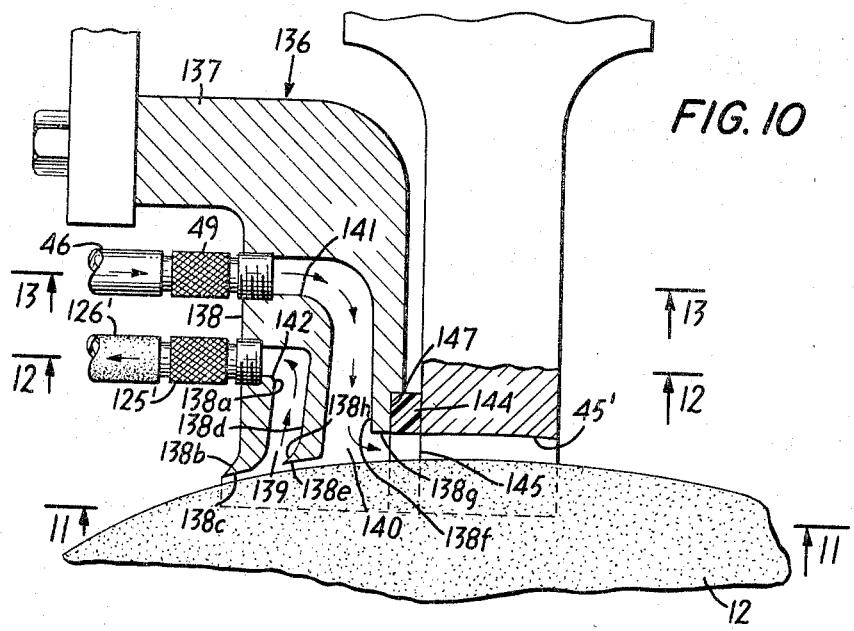
FIG. 10 is an enlarged view, partly in section of a portion of the cleaning tool of the tranducer assembly and the suction and fluid supply block in operative relation to a grinding wheel of FIG. 8.
Figure 11:
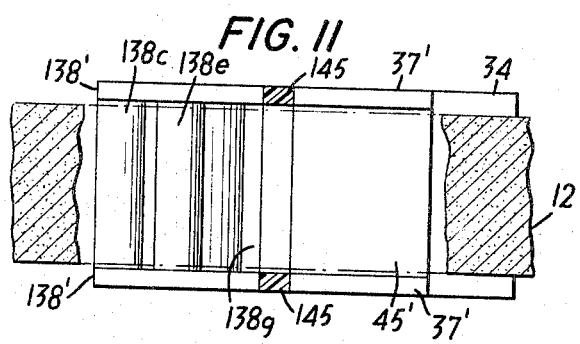
FIG. 11 is an underface view of the working faces of the suction and fluid suply block and cleaning tool shown in FIGS. 8 and 10, taken along the line 11—11 of FIG. 10.
Figure 12:
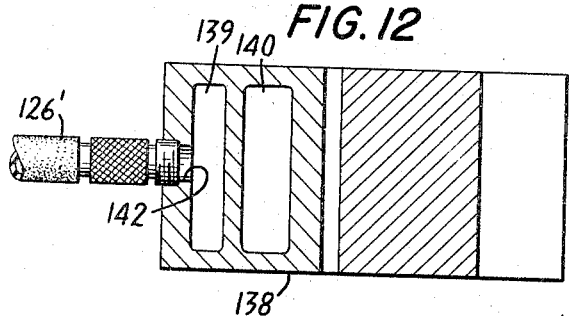
FIG. 12 is a fragmentary transverse section of the suction and fluid supply block and the cleaning tool shown in FIGS. 8 and 10 as the same would appear when viewed along line 12—12 of FIG. 10.
Figure 15:
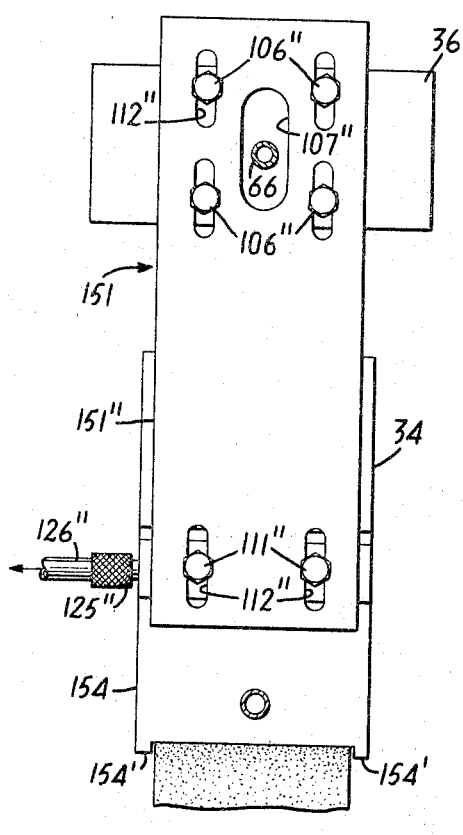
FIG. 15 is a side view of the cleaning attachment and the suction and liquid supply block mounted in operative relation to each other and to a grinding wheel of FIG. 14.

The hood 136, which may be composed of a substantially solid block of metal, or plastic, or a combination of the two materials, functions both to apply the suction force and supply cavitational fluid to the wheel. As shown in FIGS. 8 through 10, the hood 136 includes a head portion 138 downwardly depending from the neck section 137. The hood 136 may be made substantially rectangular in cross-section, and of substantially the same transverse thickness throughout its length. The face of the head section 138 is shaped in substantial conformity with the periphery of the grinding wheel and presents side flanges 138' shaped and designed to neatly overlap the sides of the grinding wheel to which it is applied.

The head portion 138 of the hood 136 (FIG. 10) has a bore 142 which communicates with a suction slot 139 having a leading edge 138a and a rear wall 138d acting as the partition element between said chamber and the liquid supply chamber 140. The cavitational liquid is fed into a bore 141 which leads to a longitudinal slot 140 which is expanded at its lower edge to provide a liquid reservoir. A partition element 138d separates the air slot 139 from the liquid slot 140 with minimal clearance between the end face 138e of this partition element and the wheel periphery 25.

The head portion is positioned immediately forward of the leading edge of the cleaning shoe 34a, and a U-shaped sealing gasket 144 formed of some resilient but wear-resistant material is positioned between the recess 147 of the heel part 138g of the hood 136 and the front face 34a of the cleaning shoe 34. The depending leg portions 145 of the gasket (FIG. 11) extend between the hood flanges 138' and the adjacent end of the shoe flanges 37' to seal off the entry of air and retain the liquid layer therebetween.

The suction force is introduced into the open end of the bore 142 by means of flexible tubing 126' and hose fitting 125'. The transverse groove or chamber 139 extending across the width of the face of the lower shoe portion 138 between the side flanges 138' thereof, is provided to introduce the suction force over the entire width of the grinding wheel 12 at one time.

Cavitational liquid is provided under pressure via the conduit 46 and fitting 49 into the bore 141. The liquid therefrom fills the chamber 140 which extends transversely of the entire wheel between the flanges 138'.

In operation, the motor fan unit 102 (FIG. 1) is initially placed in operation to create a vacuum or suction within the chamber 139 of shoe 136 when the latter's face is positioned in close proximity to the working surface of the grinding wheel 12. Since the dirt-laden air is immediately removed from the working surface of the grinding wheel by the suction applied to the chamber 139, a partial vacuum is thereby created to permit the entrance of a liquid layer, through chamber 140, that will be substantially solid.

As in the previous embodiment, the configuration of the hood 136 is such that the peripheral air layer is removed by deflection, as well as by pressure differential. The leading edge of the hood is provided with a deflecting lip 138b and a similar lip 138h is provided at the lower edge of the back wall of the suction passage 139. Preferably the bottom surface and flanges of the hood 136 are ground to fit on the grinding wheel with which they are to be used to provide maximum effectiveness.

From the above it is apparent that as the wheel 12 rotates in the direction indicated by the arrow, the liquid supplied to the chamber 140 is effectively withdrawn therefrom by the rotating movement of the wheel 12 to form an even and solid layer of cavitational liquid filling the cleaning gap.

By introducing the cavitational liquid coolant through the hood 136, rather than through the cleaning shoe 34 as in the previous embodiment, the expense of machining the slot and internal passages in tool 34, as illustrated in FIG. 5, is avoided. When machining a slot in a tool that is to be ultrasonically vibrated, a fine surface finish must be maintained to avoid surface irregularities that tend to cause tool fracture and thereby reduce the life of the tool. Since hood 136 is not vibrated, the surface finish of its internal chambers is not critical and only the working faces of said hood need be of a superior finish. The member may simply be cast of aluminum or plastic to further reduce the cost. Moreover, since the hood does not vibrate, a simple rigid coupling of the liquid conduit 46 thereto may be used, rather than the type shown in FIG. 5.

The spacing gap between the working face 138g of the rear wall 138f and the wheel periphery 25 preferably will vary from a minimum of .001 inch to a maximum of .187 inch. This spacing is determined after evaluating the grinding wheel composition, the grinding speed, the material being ground and the frequency of the ultrasonic motor and may be greater or less than the thickness of the cleaning gap beneath the tool 34. In this manner it is possible to have a step-down condition whereby the liquid may initially start out as a .125 inch layer and be stepped-down after passing beneath the sealing gasket 144 and into the gap between the working face 45' of the tool 34 and the grinding wheel periphery. This decrease of the gap thickness increases the pressure of the liquid forcing a certain quantity of it from beneath the face of the tool and between the overlapping tool flanges. This aids in preventing the inflow of air into the gap prior to the time in which the liquid layer is to be cavitated beneath the work surface of the vibrated tool. Furthermore, by having the spacing of the tool face 45' to the wheel periphery 25 decreased, a back pressure is built up forcing a certain amount of liquid in a direction opposite to the rotation of the grinding wheel, again aiding in minimizing the amount of air beneath the surface in which the liquid is to be cavitated.

The minimum spacing between the working face 138g of the rear wall 138f and the wheel periphery should be in the order of .001 inch or of a greater dimension when all the working faces of the head portion 138 are are equally spaced from the wheel periphery. This includes the working face 138c of the front wall 138a, the working face 138e of the partition element 138d and the working face 138g of the rear wall 138f.

When this condition exists the shoe flanges 138' may be formed by pushing the lower end of the shoe 136 into grinding contact with the peripheral surface of the grinding wheel with which the shoe is to be used, until the side flanges 138' have been formed which snugly overlap the sides of the grinding wheel for approximately 3/16 of an inch. This procedure provides the shoe 136 with contoured surfaces which are in substantial arcuate conformity to the outer peripheral surface of the grinding wheel. The shoe 136 is then backed off from the peripheral surface of the grinding wheel by an amount sufficient so that the instep portion 138b serves as a baffle initially deflecting peripheral air.

The above described method may be utilized as the initial processing step also when the intended gap beneath the surface 138g is to be greater than the gap between the surfaces 138c and 138e and the periphery of the grinding wheel (see FIG. 10). After the first grinding operation, the hood 136 is removed and the additional depth of the rear wall is obtained by a separate grinding operation. Alternatively, the rear wall may be constructed from a separate member and dovetailed for vertical movement on the hood 136. In this manner the face 138g of the rear wall 138f may be first positioned parallel to the lower surfaces 138c and 138e and then the three shoe faces may be ground in the initially described manner. The rear wall is then adjustably raised to provided whatever gap is required after the grinding conditions have been evaluated.

In FIGS. 14 through 19 there is illustrated still another embodiment of the present invention. As in the case of the preceding embodiment, the cavitational liquid is supplied to the surface of the wheel through a non-vibrating hood located immediately forward of the ultrasonically vibrating cleaning tool.

As will be apparent from the drawings, the overall assembly is generally similar to that shown in FIGS. 8 through 13 and reference may be had to the description of the mounting arrangement thereof for an understanding of the configuration of the support plate 151 and its relationship to the block 36 on the ultrasonic cleaning apparatus.

Referring more particularly to FIGS. 14 and 16, the hood 152 is generally similar in external appearance to the hood 136 of the preceding embodiment. It differs therefrom however in having but a single chamber or cavity 156, which comprises a substantial portion of the volume of the head portion 154 of the hood. The hood also includes a pair of side flanges 154' overlapping the sides of the grinding wheel with which it is to be used and is sealed to the front face of the cleaning shoe 34 by a U-shaped gasket 160, in the manner described with respect to the preceding embodiments.

The leading edge of the hood 152 is provided with a deflecting lip 154" at its lower edge which acts as a barrier eliminating a substantial portion of the peripheral air layer on the grinding wheel. The surfaces 154d and 154e of the hood 152 may be formed by grinding as has been described in connection with the preceding embodiments.

Near the uppermost end of the chamber 156 is provided a bore 162 communicating with an exterior side wall of the hood. The vaccum pump 102 (FIG. 1) is coupled by conduit 156 and through fitting 125" to the bore 162. The cavitational liquid source is coupled over conduit 46" and threaded fitting 49" through a bore 155 in the front wall of the hood 152. Thus, the cavitational liquid is being supplied to the chamber along with the suction force.

In operation, the rate of flow of cavitational liquid into the chamber 156 is adjusted with respect to the rate at which liquid is withdrawn therefrom by the moving grinding wheel into the cleaning gap beneath the cleaning tool 34 such that the liquid level in the chamber 156 does not rise much above the input bore 155. As the wheel rotates, a good proportion of the air is eliminated by the deflecting edge 154" of the hood, and the remaining air entering beneath the cavity bubbles up through the reservoir of cavitational liquid to be drawn off by the suction force applied at its upper end. If desired, a small impeller wheel (not shown) operated by the flow of cavitational liquid may be inserted in the chamber to facilitate the separation of the air bubbles from the liquid.

It will appreciated that this embodiment is similar to the preceding embodiment in that the cavitational liquid is supplied to the wheel surface through a nonvibrating member which allows simpler and less expensive fabrication both of the cleaning tool and the air eliminating structure. The last described embodiment offers the further simplification in that but a single chamber is required within the hood 152 with a consequent savings in fabrication. The clearance between the edges 154d and 154e of the member 152 may be generally similar to those described in connection with the embodiment of FIG. 10, i.e., approximately .001 inch beneath surface 154d and from .001 to .187 inch between 154e and the wheel surface. The latter may thus provide the step down function which increases the liquid pressure at the cleaning gap to thereby insure the air free cavitational layer. For this purpose, the gap beneath the edge 154e is preferably in the order of from .010 to .030 inch.

It will be seen from the foregoing that method and means are provided by the present invention for effectively reducing or eliminating the air layer normally hugging the peripheral surface of a rotating grinding wheel or the like, whereby a liquid layer may be placed in intimate contact therewith. The air layer removal is accomplished both by mechanical deflection and by creation of a pressure differential at the surface which establishes a suction force to draw off remaining air that may even lie below the extremities of the outermost particles on the rotating surface. Although the techniques and apparatus disclosed have found particular application to grinding wheel cleaning devices such as those described in the aforementioned patents of the present assignee, it will be understood that they are applicable wherever elimination of an air layer to allow intimate contact between a surface and a subsequently applied material is to be accomplished. It will also be understood that the particular structural arrangements shown and described herein are to be taken as illustrative only and that various modifications and changes will become apparent to those skilled in the art and which do not depart from the spirit of the invention. Accordingly, the invention is to be limited only by the scope of the appended claims.

We claim:

1. A method of treating with a liquid a moving surface which during movement acquires an adherent layer of air, comprising the steps of creating an area of pressure below atmospheric at a point along the path of said surface to thereby draw off said layer of air from successive portions of said surface, substantially immediately thereafter and before any significant amount of additional air can reach the then cleared portion supplying a liquid to said surface in sufficient quantity to establish a solid film in intimate contact therewith, and applying vibratory forces to said film to alternately increase and decrease the pressure of said liquid against said surface.

2. A method of treating with a liquid a moving surface which during movement acquires an adherent layer of air, comprising the steps of at a point along its path of motion mechanically deflecting a significant portion of said air layer, substantially immediately behind said deflection point with respect to the direction of movement of said surface reducing the pressure over said moving surface to a value below atmospheric thereby to draw off substantially all of the remaining air in said layer, thereafter and before any significant amount of additional air can reach said cleared surface supplying a liquid to said surface in sufficient quantity to establish a solid film in intimate contact therewith, and applying vibratory forces to said film to alternately increase and decrease the pressure of said liquid against said surface.

3. A method of maintaining the peripheral working surface of a grinding wheel free of loosened abrasive grains and debris while said wheel is rotating at normal grinding speeds and performing a grinding operation, comprising the steps of reducing the pressure over a continuously changing portion of the surface of said wheel as it rotates to a value below atmospheric to draw off the air layer adhering thereto, substantially immediately thereafter introducing under pressure a liquid capable of supporting cavitation to a confined area adjacent the portion of the wheel surface from which the air has just been removed to establish a substantially solid liquid film in intimate contact with said wheel surface, and engendering cavitational action in said liquid film, whereby the disruptive forces created at the wheel surface by the cavitational action serve to dislodge loosened abrasive grains and debris therefrom.

4. A method of maintaining the peripheral working surface of a grinding wheel free of loosened abrasive grains and debris while said wheel is rotating at normal grinding speeds and performing a grinding operation, comprising the steps of continuously maintaining a pressure below atmospheric over a limited area adjacent the peripheral working surface of the wheel as it rotates to subject successive portions of said working surfaces thereto and thereby remove the air layer adhering to said portions, substantially immediately thereafter continuously introducing under pressure a liquid capable of supporting cavitation to a confined area adjacent the portion of the wheel surface from which the air has just been removed to establish a substantially solid liquid film inintimate contact with said wheel surface, and applying ultrasonically vibratory forces to said film to alternately increase and decrease the pressure of said film against the wheel surface and to engender cavitational action in said liquid film, whereby the disruptive forces created at the wheel surface by the cavitational action serve to dislodge loosened abrasive grains and debris therefrom.

5. Apparatus for maintaining the peripheral working surface of a grinding wheel substantially free of loosened abrasive grains and debris while said wheel is rotating at normal grinding speeds and performing a grinding operation comprising, a cleaning tool having a cleaning face shaped in substantial arcuate conformity to the peripheral working surface of the wheel and a pair of flanges on opposite sides of said cleaning face spaced to overlap the sides of said wheel with minimal clearance therebetween, means for mounting said cleaning tool with said cleaning face closely spaced from said wheel surface to define a gap therebetween, means for vibrating said cleaning tool at an ultrasonic frequency to alternately increase and decrease the thickness of said gap at the frequency of vibration, means mounted forwardly of said cleaning tool with respect to the direction of rotation of said wheel for establishing a reduced pressure area adjacent the path of the working surface of said wheel to draw off at least a portion of the air adhering thereto just prior to its movement into operative relationship to said cleaning tool, and means for introducing a liquid capable of supporting cavitation into said gap after the air has been removed from the wheel surface, whereby said liquid substantially fills said gap to support intense cavitation at the surface of the wheel.

6. Apparatus for maintaining the peripheral working surface of a grinding wheel substantially free of loosened abrasive grains and debris while said wheel is rotating at normal grinding speeds and performing a grinding operation comprising, a cleaning tool having a cleaning face shaped in substantial arcuate conformity to the peripheral working surface of the wheel and a pair of flanges on opposite sides of said cleaning face spaced to overlap the sides of said wheel with minimal clearance therebetween, means for mounting said cleaning tool with said cleaning face closely spaced from said wheel surface to define a gap therebetween, means for vibrating said cleaning tool at an ultrasonic frequency to alternately increase and decrease the thickness of said gap at the frequency of vibration, means mounted forwardly of said cleaning tool with respect to the direction of rotation of said wheel for deflecting at least a portion of the air adhering to said working surface, means mounted between said deflecting means and said cleaning tool for establishing a reduced pressure area adjacent the path of said working surface to draw off a substantial proportion of the air remaining on said wheel surface just prior to its movement into operative relationship to said cleaning tool, and means for introducing a liquid capable of supporting cavitation into said gap after the air has been removed from the wheel surface, whereby said liquid substantially fills said gap to support intense cavitation at the surface of the wheel.

7. Apparatus for maintaining the peripheral working surface of a grinding wheel substantially free of loosened abrasive grains and debris while said wheel is rotating at normal grinding speeds and performing a grinding operation comprising, a cleaning tool having a cleaning face shaped in substantial arcuate conformity to the peripheral working surface of the wheel and a pair of flanges on opposite sides of said cleaning face spaced to overlap the sides of said wheel with minimal clearance therebetween, means for mounting said cleaning tool with said cleaning face closely spaced from said wheel surface to define a gap therebetween, means for vibrating said cleaning tool at an ultrasonic frequency to alternately increase and decrease the thickness of said gap at the frequency of vibration, suction means mounted forwardly of said cleaning tool with respect to the direction of rotation of said wheel for removing air adhering to the working surface of the wheel just prior to its movement into operative relationship to said cleaning tool, and means for introducing under pressure a liquid capable of supporting cavitation through a passage provided in said tool into said gap after the air has been removed from the wheel surface, whereby said liquid substantially fills said gap to support intense cavitation at the surface of the wheel.

8. Apparatus for maintaining the peripheral working surface of a grinding wheel substantially free of loosened abrasive grains and debris while said wheel is rotating at normal grinding speeds and performing a grinding operation comprising, a cleaning tool having a cleaning face shaped in substantial arcuate conformity to the peripheral working surface of the wheel and a pair of flanges on opposite sides of said cleaning face spaced to overlap the sides of said wheel with minimal clearance therebetween, means for mounting said cleaning tool with said cleaning face closely spaced from said wheel surface to define a gap therebetween, means for vibrating said cleaning tool at an ultrasonic frequency to alternately increase and decrease the thickness of said gap at the frequency of vibration, suction means mounted forwardly of said cleaning tool with respect to the direction of rotation of said wheel for removing air adhering to the working surface of the wheel just prior to its movement into operative relationship to said cleaning tool, and means for introducing under pressure a liquid capable of supporting cavitation into the leading edge of said gap after the air has been removed from the wheel surface, whereby said liquid substantially fills said gap to support intense cavitation at the surface of the wheel.

9. Apparatus for removing the peripheral layer of air from the working surface of a grinding wheel rotating at normal grinding speeds comprising, a hood member having one end shaped in substantial conformity to the peripheral working surface of the grinding wheel with which it is associated, a pair of flanges on opposite sides of said one end of said hood member spaced to closely overlap the sides of said grinding wheel with minimal clearance therebetween, a plurality of passageways provided through at least a portion of said hood member and extending to respective openings in said shaped end, means for mounting said hood member with said shaped end and said flanges closely spaced to said working surface and sides, respectively, of said grinding wheel, means for establishing a pressure substantially below atmospheric, means coupling said reduced pressure to the end of one of said passageways remote from said shaped end of said hood member, and means adapted to couple a source of fluid to the remote end of another of said passageways.

References Cited

UNITED STATES PATENTS

| | | | |
|---|---|---|---|
| 956,762 | 5/1910 | Furrow | 51—273 |
| 2,789,404 | 4/1957 | Downing et al. | 51—273 |
| 2,858,652 | 11/1958 | Luthman et al. | 51—267 |
| 3,123,950 | 3/1964 | Kuris et al. | 51—262 |
| 3,123,951 | 3/1964 | Kuris et al. | 51—262 |

FOREIGN PATENTS

| | | |
|---|---|---|
| 848,564 | 9/1960 | Great Britain. |

LESTER M. SWINGLE, *Primary Examiner.*